United States Patent [19]
Burlington

[11] Patent Number: 5,443,196
[45] Date of Patent: Aug. 22, 1995

[54] FASTENER APPLICATOR

[75] Inventor: Geoffrey M. Burlington, Crowborough, Great Britain

[73] Assignee: Illinois Tool Works, Inc., Glenview, Ill.

[21] Appl. No.: 989,374

[22] Filed: Dec. 11, 1992

[30] Foreign Application Priority Data

Dec. 11, 1991 [GB] United Kingdom ............... 9126338

[51] Int. Cl.6 .......................................... B25C 5/15
[52] U.S. Cl. ................................ 227/131; 227/133; 227/120; 227/147; 74/572; 173/124; 310/68 E
[58] Field of Search ............. 227/131, 133, 129, 120, 227/147; 74/572; 464/36, 29; 173/117, 122, 124, 205, 97, 94; 310/68 B, 68 E, 84, 57, 100

[56] References Cited

U.S. PATENT DOCUMENTS

| | | | |
|---|---|---|---|
| 1,860,826 | 5/1932 | Tschudi | 173/205 |
| 1,877,162 | 9/1932 | Day. | |
| 1,988,922 | 1/1935 | Stephenson | 464/29 |
| 2,738,391 | 3/1956 | Tesh | 310/68 E |
| 3,128,400 | 4/1964 | Hornschuch et al. | 310/100 |
| 4,042,036 | 8/1977 | Smith et al. | 173/124 |
| 4,161,272 | 7/1979 | Brockl | 227/131 |
| 4,204,622 | 5/1980 | Smith et al. . | |
| 4,385,276 | 5/1983 | Bitzel | 310/47 |
| 4,423,346 | 12/1983 | Nakazawa | 310/68 E |
| 4,572,419 | 2/1986 | Klaus et al. . | |
| 4,625,903 | 12/1986 | Becht | 173/13 |
| 4,721,170 | 1/1988 | Rees | 173/124 |
| 4,885,440 | 12/1989 | Kachuk | 310/68 E |
| 5,005,684 | 4/1991 | Fujii | 464/36 |
| 5,025,869 | 6/1991 | Terunuma et al. | 173/205 |
| 5,069,379 | 12/1991 | Kerrigan | 227/131 |

Primary Examiner—Eugenia Jones
Assistant Examiner—Allan M. Schrock
Attorney, Agent, or Firm—Spensley, Horn Jubas & Lubitz

[57] ABSTRACT

A fastener applicator, for example for cable clips, uses the kinetic energy of a flywheel rotated by a prime mover, preferably a battery driven electric motor, to drive a striker for firing a fastener into a support. An actuator which strikes the striker may be a fixed projection on the flywheel or be an element on the flywheel movable relative to the flywheel by centrifugal force to project the actuator from an inoperative position to an operative position for striking the striker. The drive from the prime mover to the flywheel is through a clutch or releasable drive coupling which temporarily disconnects the drive when the actuator strikes the striker so that the kinetic energy at the flywheel alone drives the striker and the prime mover is protected from the impact. A micro-processor measures the rotational speed of the flywheel and stops the prime mover when a pre-determined speed for the necessary kinetic energy is achieved.

8 Claims, 4 Drawing Sheets

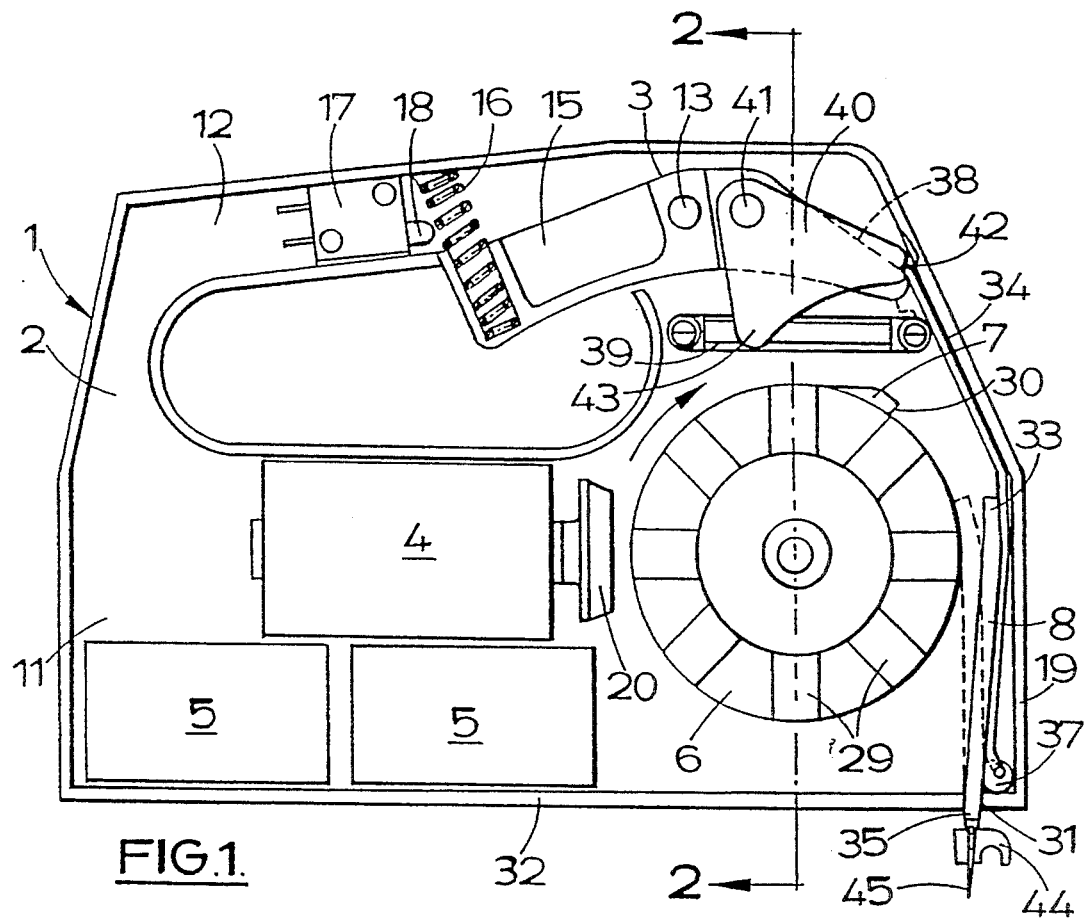
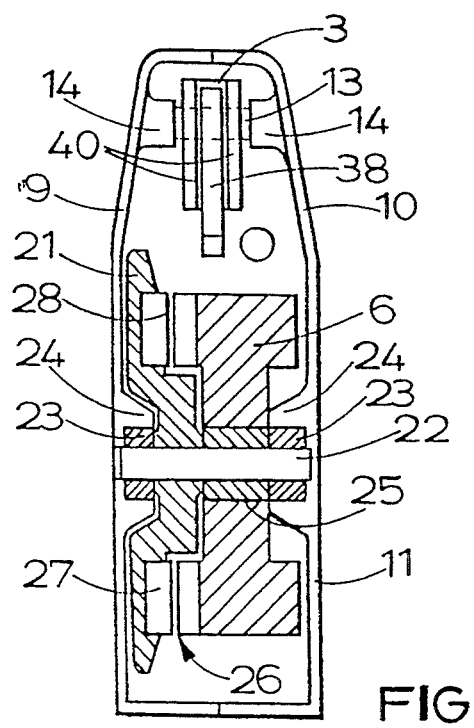
FIG.1.
FIG.2.

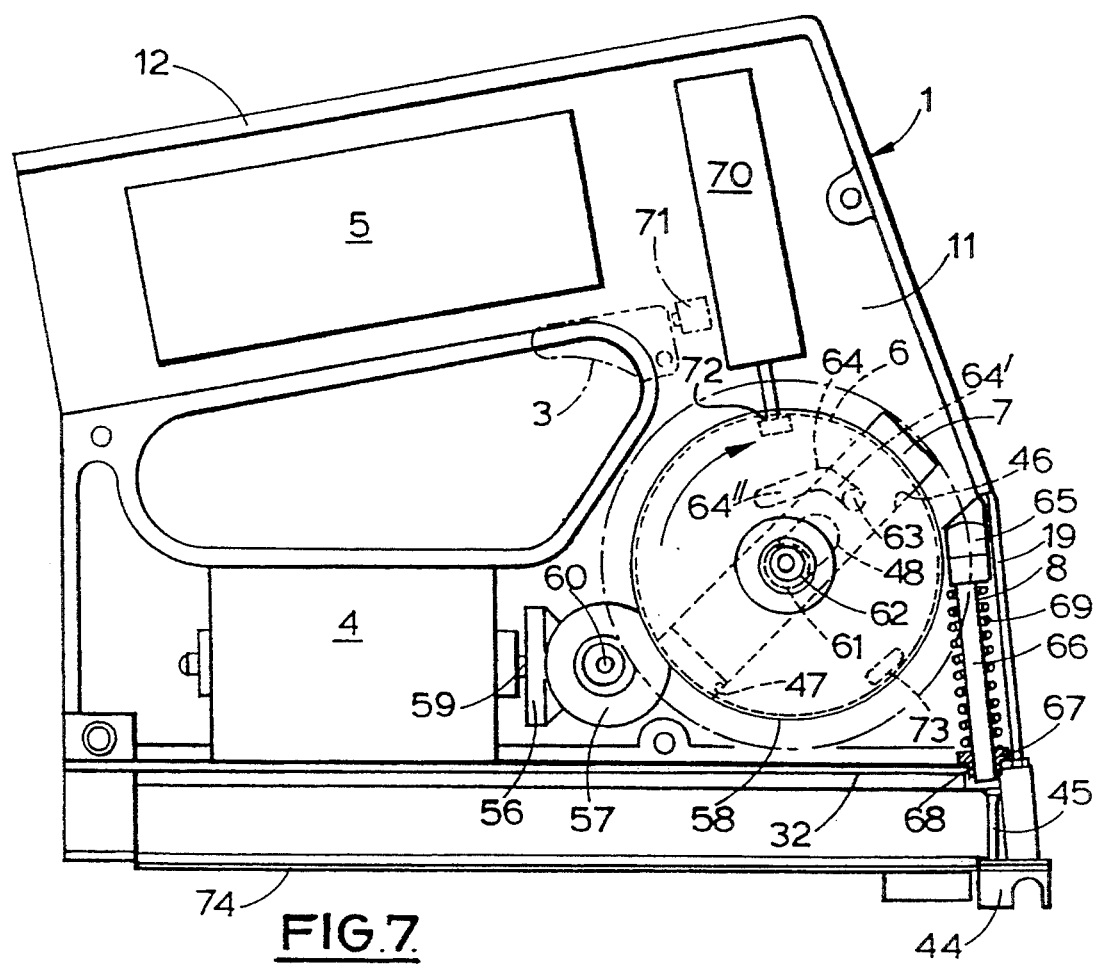
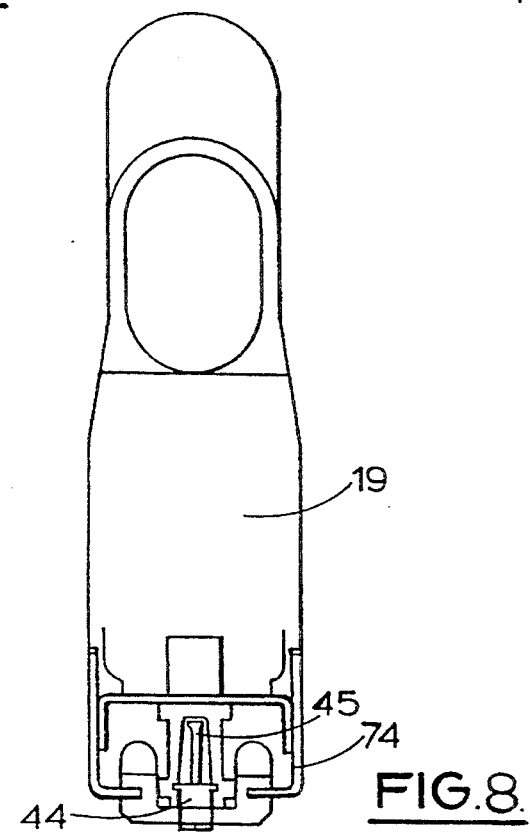

FASTENER APPLICATOR

This invention relates to fastener applicators of the kind for applying fasteners, for example staples, tacks, pins, clips and the like, which require an anchorage part thereof to be driven into a support to secure the fasteners in position for use.

Conventional applicators generally comprise a body, a striker blade guided in the body for movement between an inoperative position and a fired position to which it is rapidly urged by spring means upon manual actuation of an operating handle on the body, and a fastener holding magazine in the body by which fasteners are fed to a driving position for their anchorage parts to be driven by the striker blade as it is urged to the fired position. Such an arrangement relies upon the potential energy of the spring means to drive the striker blade.

It is also known to provide electro-mechanical fastener applicators in which the rotary motion of a member rotated by an electrically powered prime mover is translated into linear movement of a striker to drive a fastener into a support. Eccentric or crankshaft arrangements have been used to translate the rotary motion into the linear motion of the striker. Cam profiles have also been used to provide the translation.

As an example of the latter, in U.S. Pat. No. 4,625,903 a flywheel mechanism is rotated by an electric motor and the rotational energy in the flywheel is transferred through an impact member in the form of a cam profile on the flywheel to a transfer member which is moved linearly, reciprocally, and co-operates with a fastener driver. The transfer member is resiliently urged towards the impact member. As the flywheel rotates the impact member repeatedly engages with and moves the transfer member linearly against the return resilient loading to cause the driver to be driven by a series of short, high-velocity strokes in rapid succession. A fastener is then driven progressively into a support under the series of strokes of the driver. This known fastener applicator relies upon the operator's urging the applicator onto the fastener for the impact member to cause the driver to be driven, otherwise no impact occurs on the driver. The electric motor continues to drive the flywheel as the rotational energy of the flywheel is being transferred to the transfer member and driver. As the fastener is being driven, therefore, and the transfer member is urged back into bearing engagement with the impact member of the flywheel between driven strokes, there is loading on the electric motor caused by the impact and friction of that engagement.

The present invention consists in a fastener applicator comprising a body, a prime mover on the body, a flywheel driven by the prime mover, an actuator rotatable with the flywheel, a fastener striker guided in the body for movement between an inoperative position and a fired position to which it is urged by the actuator's rotating with the flywheel and striking the striker, and releasable transmission means whereby the flywheel is caused to be disconnected from the drive of the prime mover when the actuator strikes the striker such that the kinetic energy at the flywheel is used to drive the striker to its fired position.

The disconnection of the flywheel from the prime mover when the actuator strikes the striker protects the prime mover from the impact. The prime mover is used solely to accelerate the flywheel to a rotational speed such as to provide the required kinetic energy for the actuator to drive the striker effectively from the inoperative position to the fired position. It does not provide drive during the driving of the striker by the actuator. Disconnection may be caused as the actuator makes contact with the striker or before there is the contact with the striker.

It may be arranged that the prime mover is made inoperative when once the flywheel has been accelerated to a pre-determined rotational speed which will provide the required kinetic energy at the flywheel for the actuator to drive the striker, thereby saving unnecessary use of energy to power the prime mover.

Conveniently the prime mover is electrically powered but other power, such as pneumatic or hydraulic power, might be utilised. One or more batteries, ideally of the re-chargeable type, may provide the electrical power. Arranging for the prime mover to be made inoperative when the flywheel has been accelerated to a required speed prolongs the active life of a battery or batteries used to power the prime mover.

The drive from the prime mover may be releasably transmitted to the flywheel through a clutch or other suitable coupling arrangement which allows temporary disconnection of the flywheel from the drive, when the actuator impacts with the striker.

The actuator may be a fixed projection on the flywheel which engages with the striker as the flywheel rotates. In another form the actuator may comprise a movable element on the flywheel which as the flywheel rotates is caused to move relative to the flywheel under centrifugal force to engage with the striker. Such an element may be arranged to move linearly relative to the rotational axis of the flywheel or it may move angularly, in the manner of a flail, relative to the flywheel. When the element has moved to an operative position for engagement with the striker it may be caused to be locked in that position against movement relative to the flywheel while it strikes the striker.

The rotational speed of the flywheel may be made to be adjustable to vary the kinetic energy developed and the impact force of the actuator on the striker.

Preferably the flywheel is accelerated to a speed to produce sufficient kinetic energy in the flywheel for the resultant force of the impact of the actuator on the striker to cause the striker to drive a fastener fully home with that single blow. The whole of the kinetic energy in the accelerated flywheel may be used in driving the driver to the operative position. The speed to which the flywheel is required to be accelerated to produce the necessary kinetic energy can be readily determined according to the mass of the flywheel and actuator. The speed may be varied to adjust the kinetic energy developed to suit the hardness of the material of the support into which a fastener is to be driven by the applicator.

Although it is preferred that the striker is caused to drive a fastener fully home with a single blow, the applicator may be arranged to have the flywheel re-connected to the drive of the prime mover for the flywheel to be primed again for the actuator to have further impact with the striker so as to complete the driving of the fastener if the fastener has not been driven fully home with one blow. The flywheel is again caused to be disconnected from the drive of the prime mover when the actuator has the further impact with the striker.

A microprocessor may be included in the applicator to measure the rotational speed of the flywheel in readiness for the actuator to strike the striker. The microprocessor may be connected to the prime mover and cause the prime mover to be made inoperative when the rotational speed of the flywheel reaches a pre-determined value. The speed to which the flywheel is rotated may be varied by the micro-processor. It may be arranged that the micro processor measures the distance to which a fastener is driven into a support under a given level of kinetic energy, for example by measuring the distance travelled by the striker from its inoperative position before it is stopped by resistance exerted on the fastener by the support. If that measured distance does not correspond to that which the fastener should travel if driven home fully, the micro-processor may then adjust the rotational speed of the flywheel to increase the kinetic energy developed by the flywheel to a level necessary to ensure that a fastener will be driven home fully into that particular support under a single impact of the actuator with the striker. The speed adjustment may be effected automatically by the micro-processor.

If, as mentioned above, it is required that the flywheel should be able to be primed for the actuator to have further impact with the striker in the event that a fastener is not driven home fully with a single blow, that facility may be provided with the aid of a micro-processor. For example, the micro-processor may be arranged to measure the distance travelled by the striker, and hence of a fastener after impact of the actuator on the striker, of respond to turning of the flywheel after impact of the actuator on the striker, and if the striker has not travelled a pre-determined extent, or the flywheel turned a pre-determined extent, the micro-processor may cause the flywheel to be rotated up to speed again by the prime mover for the striker to be struck again by the actuator to complete driving of the fastener.

The applicator now provided drives a fastener solely by the kinetic energy produced in the flywheel. When the applicator is in position for applying a fastener to a support the operator need only operate the prime mover and the applicator will function to drive the fastener into the support. The operator does not have to manipulate the applicator further or urge it on to the fastener to ensure that the fastener is driven.

The striker may be in the form of a blade or bolt which is normally urged to the inoperative position. It may be resiliently urged to the inoperative position. The striker may be moved tangentially of the arcuate path along which the actuator travels to engage with the striker. Loading may be exerted on the striker to urge it angularly towards an attitude necessary for it to be driven by the actuator to its fired position. However, the striker may be held away from that attitude, against the loading, by latch, detent or other suitable retainer means until it is required to be driven to the fired position. Release of the striker to the attitude for it to be driven by the actuator may be timed relative to the movement of the actuator to ensure that it is correctly positioned to be struck. The actuator may trip the retainer means as it moves towards the position for driving the striker, thereby releasing the striker for it to be in the required attitude before the actuator reaches that position. Resetting of the retainer means to hold the striker again against the loading may be accomplished automatically after the fastener applicator has been operated.

Fasteners to be applied by the fastener applicator may be located individually on the body at a driving position for their anchorage parts to be driven by the striker. More conveniently, they are loaded into a magazine in the body which feeds them to the driving position. The magazine may be of a known form appropriate for the type of fasteners which the applicator is adapted to apply.

An embodiment of the invention will now be described by way of example only with reference to the accompanying drawings, in which:

FIG. 1 is a simplified longitudinal section through a fastener applicator in accordance with the present invention;

FIG. 2 is a cross-section on line 2—2 of FIG. 1;

FIG. 7 is a simplified longitudinal section through the fastener applicator showing a further modification, and FIG. 8 is a rear view of the applicator shown in FIG. 7.

Figure 3:
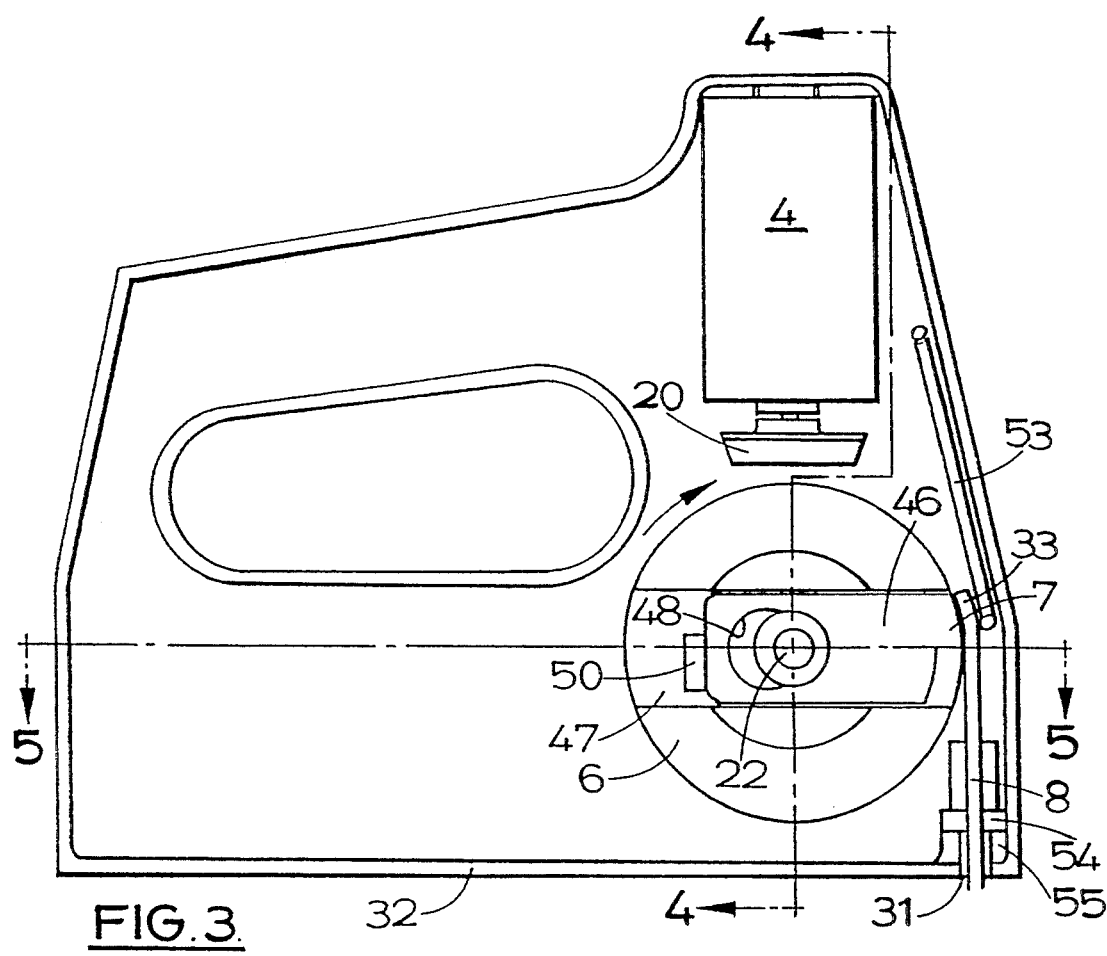
FIG. 3 is a simplified longitudinal section through the fastener applicator showing a modification.
Figure 4:
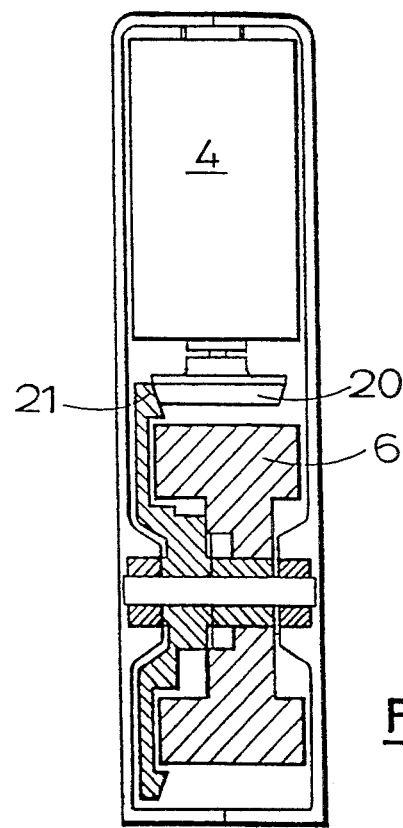
FIG. 4 is a cross-section on line 4—4 of FIG. 3.
Figure 5:
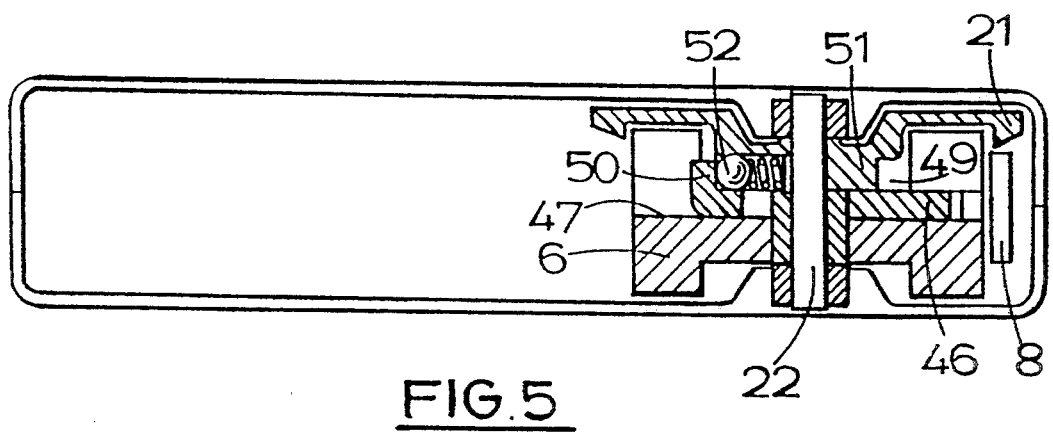
FIG. 5 is a cross-section on line 5—5 of FIG. 3.
Figure 6:
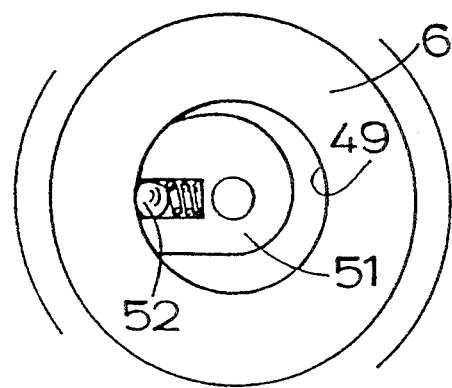
FIG. 6 is a detail view of a flywheel of the fastener applicator of FIG. 3.

In this embodiment of the invention a fastener applicator is provided which is designed for applying electrical cable clips to supports. It is of a compact size suitable for holding in one hand.

Referring to FIGS. 1 and 2 of the drawings, the fastener applicator comprises a body 1 having a handle 2 at which there is an operating trigger 3, an electric DC motor 4 powered by rechargeable batteries 5, a flywheel 6 driven by the motor 4 and carrying an actuator 7 at its periphery, and a striker 8 with which the actuator 7 co-operates.

The body 1 comprises two cast or moulded shells 9, 10 secured together to form an oblong hollow housing 11 in which the trigger 3, motor 4, batteries 5, flywheel 6 and striker 8 are located. The handle 2 is formed by an integral loop of the housing 11 and has a handgrip part 12.

The trigger 3 is a lever pivoted at an intermediate part of its length in the housing, in front of the handgrip 12, by a pivot pin 13 journalled in opposed bearing bosses 14 in the shells 9, 10. A rearward operating portion 15 of the trigger is normally urged by a helical compression spring 16, acting between that portion and the handgrip, to project from the handgrip where it can be squeezed to pivot the trigger, against the spring-loading, by a person holding the applicator at the handgrip.

In the handgrip 12 there is a micro-switch 17 which is electrically wired to the batteries 5 and motor 4. An operating plunger 18 of the micro-switch 17 is positioned to be engaged by the operating portion 15 of the trigger 3 when the trigger is squeezed, so as to operate the switch and cause the motor to be energised.

Motor 4 is mounted in the housing 11 with its drive shaft, not shown, extending longitudinally of the housing and projecting towards a front wall 19 of the body. The rotational axis of the drive shaft intersects the rotational axis of the flywheel 6, which is towards the front wall 19 of the body. A driving bevel gear 20 carried by the drive shaft engages with a larger driven bevel gear 21 mounted co-axially with the flywheel 6 on a spindle 22 extending between and rotatable in bushes 23 in bearing bosses 24 in the shells 9, 10. The flywheel 6, which is made of magnetic steel, is freely rotatable on the spindle 22, on a bush 25, relative to the driven gear 21 but is normally connected to the driven gear by a magnetic coupling 26 so as to be rotated by the gear. The magnetic coupling 26 comprises an annulus 27, fixed concentrically to the driven gear 21, carrying a series of equi-angularly spaced ferrite magnet poles 28 which couple with similarly equi-angularly spaced face castellations forming discrete poles 29 on an adjacent radial face of the flywheel. Normally the magnetic coupling 26 holds the flywheel to the driven gear 21 so that it rotates with the gear but it allows temporary disengagement of the driving connection between them under an impact load on the flywheel. The gear is thus able to continue rotating separately from the flywheel whilst the flywheel absorbs the impact load, and the magnetic coupling re-connects the flywheel to the driven gear as soon as it is free of the impact load. The bevel gearing and motor are therefore protected from the impact load.

Actuator 7 carried by the flywheel 6 is in the form of a sprag having a radial impact face 30 projecting from the periphery of the flywheel.

The striker 8 is positioned at the opposite side of the flywheel from the motor, as shown in FIG. 1, and in its operative movement extends tangentially of the flywheel to, and through a hole 31 of complementary cross-section in, a base wall 32 of the housing. The striker 8 is a rigid blade of low inertia which is substantially straight except at a proximal end 33 adjacent to the flywheel where it is slightly curved arcuately complementally to the periphery of the flywheel. A carrier 34, of rigid strip form, extends adjacent to the front wall 19 of the body and slidingly supports the striker 8 for reciprocating movement through the hole 31. A spring return, not shown, urges the striker 8 to an inoperative position in which a distal end 35 of the striker blade is projected just a short distance through the hole 31. When the striker extends tangentially of the flywheel, as indicated in broken lines in FIG. 1, its proximal end 33 is positioned to be engaged by the actuator 7. The impact of the actuator on the proximal end 33 drives the striker tangentially of the flywheel in the direction of the base wall 32 to a fired position in which the distal end 35 projects further through the hole.

One end of the carrier 34 has a pivotal connection 37 to the base wall 32 of the housing adjacent to the hole 31. From the pivotal connection 37 the carrier 34 extends along the front wall 19 towards a forward end 38 of the trigger 3. A helical tension spring 39 connected to the body 1 and to the carrier near to the trigger urges the carrier towards the flywheel for the proximal end 33 of striker to engage with the periphery of the flywheel, and for the striker to extend tangentially of the flywheel. However, a triangular latch member 40 pivoted at a pivot 41 adjacent one corner to the trigger, between the forward end 38 of the trigger and the pivot pin 13, has at a second corner a notch 42 which engages with the adjacent end of the carrier and holds the carrier in a forward position, as shown in full lines in FIG. 1, against the loading of the tension spring 39. In that forward position the striker is tilted angularly about the hole 31 to a withdrawn position in which its proximal end is out of the path of the actuator on the flywheel. The latch member 40 holds the carrier in that position whilst the trigger is inoperative. During that time a third corner 43 of the latch member extending towards the flywheel is held clear of the path of the actuator 7. When the rearward operating portion 15 of the trigger is squeezed by a user the forward end 38 of the trigger pivots towards the flywheel and that movement swings the latch member 40, rocking about the engagement of the notch 42 with the carrier, towards the flywheel to bring the third corner 43 into the path of the actuator 7. As the actuator hits that third corner 43, the latch member pivots relative to the trigger about the pivot 41 and releases the notch from the carrier, so that the tension spring 39 then moves the carrier and striker to the flywheel. The release of the striker is timed so that its proximal end 33 is fully positioned in the path of the actuator 7 by the time the actuator reaches the striker.

Although not shown, supported by the body below the base wall 32 is a magazine into which cable clips 44 are loaded. The cable clips are spring-urged towards the front wall 19 of the body where the foremost cable clip occupies a position in which its anchorage pin 45 is directly opposite the hole 31 in alignment with the distal end 35 of the striker.

To operate the fastener applicator, the user squeezes the trigger 3 which operates the micro-switch 17 to energise the motor 4. The motor drives the bevel gears and accelerates the flywheel through the magnetic coupling 26. As the squeezing movement of the trigger nears its end the latch member 40 is moved sufficiently for its third corner 43 to be hit by the actuator 7, so as to release the catch and cause the striker to be urged against the flywheel in readiness to be struck by the actuator. The actuator then strikes the proximal end of the striker to shoot the striker to its fired position, and so drive the anchorage pin 45 of the cable clip which is opposite the distal end 35 of the striker. When the user releases the trigger the compression spring 16 urges the trigger to pivot back to its normal at-rest position and the micro-switch cuts out the motor. The pivoting movement of the trigger moves the latch member 40 away from the flywheel and the notch 42 at its forward end 38 re-engages with the carrier to move it, and the striker blade, away from the flywheel.

Preferably the motor runs at 10,000–11,000 rpm, operating from two 1.2 volt nickel cadmium batteries connected in series with 7 amp average consumption so that approximately 17 watts of input power is provided. That power is achieved in 2.5–3.00 seconds from start-up. The bevel gears 20, 21 reduce the rotational speed of the flywheel to about 3200 rpm. At that speed the flywheel contains sufficient kinetic energy for the actuator to drive an anchorage pin in a single blow up to 20 mm into support materials to which cable clips are usually expected to be attached.

It will be appreciated that the magnetic coupling, by temporarily enabling the flywheel to be disconnected from the driven gear 21 under the impact of the actuator's striking the striker, not only protects the gears and motor but also allows the flywheel to absorb the force of the impact blow so that the user of the fastener applicator is not subjected to the reaction force. In this respect the applicator is more comfortable for the user to use than is generally the case with known fastener applicators employing potential energy as the driving force.

Reference will now be made to FIGS. 3 to 6 of the drawings which show a modified version of the fastener applicator described above. Parts of the fastener applicator in corresponding to those the embodiment described are identified by the same reference numerals.

The motor 4 is turned through 90° from the position occupied in the embodiment described but it similarly drives the flywheel 6 through reduction bevel gears 20, 21.

The main difference in this modified version of the fastener applicator lies in the form of the actuator 7 and its operation. The actuator 7 is formed by a sprag on the outer end of a sliding member 46 mounted for radial sliding movement in a diametral guide groove 47 in a face of the flywheel. A slot 48, FIG. 3, in the sliding member 46 through which the spindle 22 carrying the driven gear 21 and the flywheel 6 extends, allows the sliding member to move radially relative to the flywheel and the spindle sufficiently for the actuator 7 to be retracted fully within the diameter of the flywheel, and to be projected from the periphery of the flywheel.

The guide groove 47 extends across and is inset, as is the sliding member 46, in the bottom of a co-axial cylindrical recess 49 in the said face of the flywheel. A tab 50 at the inner end of the sliding member projects towards the recess 49 and engages with the profile of a snail cam 51, FIG. 6, formed integrally with the hub of the driven gear 21, accommodated in the recess. The radius of the recess 49 is complementary to the maximum radius of the cam 51. At the portion of the cam's profile having the maximum radius there is a spring-loaded ball 52 which bears on the circumferential wall of the recess 49. That engagement of the ball 52 with the flywheel drivingly connects the driven gear 21 to the flywheel. The engagement allows temporary disconnection of the drive to the flywheel.

When the flywheel is accelerated the sliding member 46 when free to do so, as will be described, slides radially outwards under centrifugal force to project the actuator 7 as the profile of the cam 51 of decreasing radii moves past the tab 50. The sliding member is moved back to retract the actuator as the maximum radius portion of the cam's profile moves to the tab.

The striker 8, FIG. 3, which the projected actuator 7 strikes is similar to that in the embodiment described but it is confined to linear movement tangentially to the flywheel. A helical tension spring 53 anchored to the housing and connected to the striker urges the striker to an inoperative position in which its proximal end 33 is in the rotational path of the actuator. The spring 53 returns the striker to the inoperative position after the actuator has driven the striker to the fired position. A resilient slug 54 fixed to the striker 8 abuts against a bearing 55 on the base wall 32 of the housing around the hole 31 and will absorb the energy of impact on the striker if upon any operation of the applicator the striker should not hit the anchorage pin of a cable clip.

In the operation of the fastener applicator, the motor is briefly energised by squeezing the trigger and the resultant drive through the bevel gears and spring-loaded ball 52 at the snail cam 51 accelerates the flywheel. When the trigger is released the motor is cut out and dynamically braked. There is consequent braking of the bevel gears but the snail cam allows the flywheel to accelerate away from the driven gear 21 under the kinetic energy it has developed and free the sliding member 46 to slide radially outwards under centrifugal force so as to project the actuator 7 for driving the striker. Under the impact of the actuator on the striker the rotational speed of the flywheel reduces and the flywheel is drivingly re-connected through the spring-loaded ball 52 with the driven bevel gear 21, the sliding member 46 being restored by the snail cam to the retracted position in which the actuator is fully withdrawn into the flywheel.

Turning now to the further modification shown in FIGS. 7 and 8 of the drawings, parts of the fastener applicator corresponding to those in the embodiment and modification described are again identified by the same reference numerals.

In this modification the motor 4 is positioned in the housing 11 similarly to the motor in FIGS. 1 and 2 but is electrically connected to a single re-chargable battery 5 mounted in the handgrip 12 of the body 1 which is made deeper to accommodate the battery. The motor drives the flywheel 6 through a reduction train of three gears, being a driving gear 56, a transfer gear 57 and a driven gear 58. The driving gear 56 is a bevel gear fast on the drive shaft 59 of the motor; the transfer gear 57 is freely rotatable on a shaft 60 supported by the housing so that the rotational axis of the transfer gear is at right angles to that of the driving gear, parallel to the rotational axis of the flywheel. Teeth of the transfer gear are partially bevelled to mesh with the teeth of the driving gear 56 and give a 1:1 ratio between those gears. The driven gear 58 is substantially larger, being of similar diameter to the flywheel, and meshes with normal, cylindrically defined portions of the teeth of the transfer gear 57. The driven gear 58 is co-axial with the flywheel and is freely rotatably mounted by a tubular hub portion 61 on a shaft 62 fixed to the flywheel.

Actuator 7 carried by the flywheel is comparable with that of the modification shown in FIGS. 3 to 6. The actuator 7 is formed by a sprag on the outer end of a sliding member 46 mounted for radial sliding movement in a diametral guide groove 47 in one face of the flywheel. There is a slot 48 in the sliding member 46 through which extend the shaft 62 carrying the driven gear 58 and the hub portion 61 of that gear. As before, the slot 48 allows the sliding member to move radially relative to the flywheel sufficiently for the actuator 7 to be retracted fully within the diameter of the flywheel, and to be projected from the periphery of the flywheel.

Intermediate the actuator 7 and the slot 48 the sliding member 46 has a peg 63 fixed to it which engages in a generally L-shaped slot 64 in the adjacent face of the drive gear 58. A short foot portion 64' of the slot 64, extends arcuately about the rotational axis of the flywheel and driven gear and a longer leg portion 64" extends towards the rotational axis, but along a chord of the face of the driven gear. The foot portion 64' extends away from the leg portion 64" in the direction of the rotational axis of the driven gear. When the peg 63 is engaged in the leg portion 64" of the slot 64 at the end of that portion nearest the said rotational axis the actuator is fully contained within the diameter of the flywheel. The leg portion 64" allows the peg to move away from the rotational axis, and hence allows the sliding member to slide along the guide groove 47 relative to the flywheel for the actuator 7 to be projected from the periphery of the flywheel. The actuator is fully projected when the peg is at the heel of the L-shaped slot 64 between the leg and foot portions. Entry of the peg 64 into the foot portion 64' then locks the sliding member against radial movement relative to the flywheel and holds the actuator projected.

The sliding member is normally fully contained within the diameter of the flywheel. However, when the flywheel is accelerated to a required rotational speed the sliding member 46 is allowed to slide radially outwards along the guide groove 41 under centrifugal force to project the actuator from the flywheel. When the actuator is fully projected rotation of the flywheel relative to the driven gear 58 moves the peg 63 of the sliding member into the foot portion 64' of the L-shaped slot 64 to hold the actuator projected.

The striker 8, FIG. 7, is confined to linear movement tangentially to the flywheel, as in the previously described embodiment. It is of T-shape, its head 65 being positioned to be engaged by the actuator 7 and its stem 66 extending parallel to the adjacent front wall 19 of the body 1. The end of the stem 66 remote from the head 65 projects through a bush 67 in a hole 68 in the base wall 32 of the housing. A helical compression spring 69 fitted on the stem 66 bears on the head 65 and bush 67 and urges the striker to an inoperative position, as shown in FIG. 7, in which the head is in the rotational path of the projected actuator.

Mounted in the forward end portion of the handle 2 of the body is a micro-processor 70 which is electrically connected to the motor 4 and to a micro-switch 71 wired to the battery 5 and motor and which the trigger 3 of the fastener applicator operates to energise the motor. The micro-processor 70 has an associated photoelectric cell 72, which responds to light at a slot 73 in the flywheel, so that the micro-processor measures the rotational speed of the flywheel. The micro-processor 70 measures the time interval between pulses produced by the photoelectric cell 72 as the flywheel rotates and causes the motor to be de-energised when the time interval reaches a pre-determined value. That value sets the required speed of the flywheel for the actuator to be operated to drive the striker.

Attached to the housing underneath and extending for the length of the base wall 32 is a magazine 74 containing a strip or file of cable clips 44 having retracted anchorage pins 45 upstanding from the clips. The clips 44 in the magazine are urged towards the front wall 19 of the housing, the leading clip of the strip or file being positioned with its upstanding anchorage pin 45 directly below the stem 66 of the striker 8.

To operate the fastener applicator, the applicator having first been positioned on a support with the leading cable clip 44 of the magazine straddling a cable to be secured to the support, the operator energises the motor by squeezing the trigger, the trigger actuating the associated micro-switch 71 which connects the battery to the motor. The motor drives and accelerates the flywheel through the gear train, the driven gear 58 driving the flywheel through the interengagement of the peg 63 on the sliding member with the inner end of the leg portion 64" of the L-shaped slot 64. The microprocessor 70 measures the time intervals of the pulses produced by the photoelectric cell as the flywheel accelerates. When the time interval reaches the required pre-determined value set at the micro-processor the micro-processor de-energises the motor which is immediately dynamically braked by the gear train. At the same time the sliding member moves radially outwards along the guide groove 47 under centrifugal force and the actuator projects from the periphery of the flywheel. When the actuator is fully projected the relative rotational movement between the flywheel and the driven gear resulting from the motor's ceasing to drive the gear train causes the peg to enter into the foot portion 64' of the L-shaped slot 64. There is lost motion between the flywheel and driven gear 58 as the peg moves along the leg portion 64" and into foot portion 64' to the closed end of the foot portion. The projection of the actuator is timed to occur just before the actuator reaches the position in its rotary travel when it engages with the head 65 of the striker. The impact of the actuator drives the striker to its fired position to drive home into the support the anchorage pin 45 of the leading cable clip 44 in the magazine, thus securing the cable clip to the support of the the cable.

The kinetic energy of the flywheel is expended upon the impact to drive the striker and so the flywheel rapidly decelerates and stops. In the course of the deceleration relative movement between the flywheel and drive gear 58 causes the peg to move back along the L-shaped slot 64 out of the foot portion 64' and into the leg portion 64" to the inner end of that portion. The actuator is thus drawn back into the flywheel by the movement of the sliding member relative to the flywheel. During the movement of the peg along the L-shaped slot there is again lost motion between the flywheel and driven gear so that the effect of the impact of the actuator upon the striker is not transferred to the drive gear, and so not to the motor. Because of the rapid deceleration of the flywheel, by the time the peg is at the inner end of the leg portion 64" of the L-shaped slot and the flywheel is drivingly connected to the driven gear again the flywheel has no driving force. It will be understood that the actuator is then fully retracted and is ready for the next operation of the applicator.

The slot 73 in the flywheel may be so positioned angularly from the actuator, and the photoelectric cell 72 be so positioned about the flywheel relative to the angular position at which the actuator strikes the striker 8, that the slot passes the photoelectric cell after the actuator has struck the striker, but only if the impact has been sufficient to drive the anchorage pin 45 of the respective cable clip fully home into the support. When the slot 73 passes the photoelectric cell the microprocessor responds to the pulse and de-energises the motor. However, if the slot does not pass the photoelectric cell within a given time interval the micro-processor initiates a further drive cycle through the motor to accelerate the flywheel for the actuator to strike the striker again to complete the driving of the anchorage pin.

I claim:

1. A fastener applicator comprising a body, a prime mover in said body, a flywheel driven by said prime mover, an actuator rotatable with said flywheel, a fastener striker guided in said body for movement between a retracted position and a fired position to which it is urged by said actuator rotating with said flywheel and striking said striker, and releasable transmission means operative between said prime mover and said flywheel, said transmission means causing said flywheel to be disconnected from said prime mover each time said actuator strikes said striker such that kinetic energy developed at said flywheel by its rotation is used to drive said striker to said fired position, wherein said actuator comprises a movable element on said flywheel movable relative to said flywheel between an inoperative position and an operative position and which as said flywheel rotates is moved under centrifugal force from its said inoperative position to its said operative position to engage with said striker.

2. A fastener applicator according to claim 1 wherein a spindle is supported by said body, said flywheel is rotatable on said spindle and has a radial face, a guide groove is provided in said radial face extending diametrically of said flywheel, a sliding member is mounted in said guide groove for sliding movement therealong, said actuator is oh said sliding member, a slot is formed in said sliding member and extends in the direction of sliding movement of said sliding member along said guide groove, and said spindle is engaged in said slot, said engagement of said spindle in said slot determining the extent of said sliding movement of said sliding member along said guide groove, and thereby of the extent of movement of said actuator between its said inoperative and operative positions.

3. A fastener applicator according to claim 2 wherein a gear wheel is supported on said body for rotation about a common axis of rotation with said flywheel and is drivably connected to said prime mover, and said releasable transmission means comprises a snail cam which is rotatable with said gear wheel and has a profile extending about said common axis of rotation having a portion of maximum radius relative to said common axis of rotation and a portion of decreasing radii relative to said common axis of rotation, a spring-loaded ball is carried by said snail cam at said maximum radius portion and a wall on said flywheel extending circumferentially about said common axis of rotation into bearing engagement with which said wall said spring-loaded ball is urged thereby to interconnect said gear wheel and said flywheel, said wall being of a radius complementary to said maximum radius portion of said snail cam and said bearing engagement normally holding said flywheel to said gear wheel to transmit drive from said gear wheel to said flywheel for rotation of said flywheel with said gear wheel, but allowing temporary disengagement of said drive transmission when said actuator strikes said striker, and said sliding member has a tab which engages with said snail cam profile whereby when relative rotation occurs between said gear wheel and said flywheel and said decreasing radius portion of said snail cam moves past said tab said sliding member is free to move along said guide groove to move said actuator to its said operative position, and when said maximum radius portion moves into engagement with said tab said sliding member is retracted along said guide groove to move said actuator to its said inoperative position.

4. A fastener applicator according to claim 2 wherein a gear wheel is supported on said body for rotation about a common axis of rotation with said flywheel and is drivably connected to said prime mover, and said releasable transmission means comprises a peg on said sliding member and a slot at said gear wheel extending away from said common axis of rotation along a chord of said gear wheel, said peg moving along said slot when said sliding member moves along said guide groove to move said actuator between its said inoperative and operative positions, and said peg and slot allowing lost motion between said flywheel and said gear wheel as said sliding member moves along said guide groove and said actuator strikes said striker.

5. A fastener applicator comprising a body, a prime mover in said body, a flywheel driven by said prime mover, an actuator rotatable with said flywheel for movement along an arcuate path, a fastener striker guided in said body for movement between a retracted position and a fired position to which it is urged by said actuator rotating with said flywheel and striking said striker, said fastener striker being further angularly movable, relative to its direction of movement between said retracted and fired positions, from said retracted position to a withdrawn position in which said striker is located out of the arcuate path of movement of said actuator, loading means acting on said striker for urging said striker from said withdrawn position to said retracted position, and releasable transmission means, operative between said prime mover and said flywheel, said transmission means causing said flywheel to be disconnected from said prime mover each time said actuator strikes said striker such that kinetic energy developed at said flywheel by its rotation is used to drive said striker to said fired position.

6. A fastener applicator according to claim 5 wherein a trigger is pivoted on said body and is operatively connected to said prime mover, spring means acts between said body and said trigger to urge said trigger to an inoperative condition, said fastener striker is a rigid blade having a proximal end and a remote end, said proximal end being positioned to be struck by said striker, said body has a wall, a guide hole is positioned in said wall and said remote end of said striker extends through said guide hole, a carrier of rigid strip form having first and second ends extends longitudinally of said striker, slidingly supports said striker for reciprocating movement between said retracted and fired positions and is pivoted to said body at said first end adjacent to said remote end of said striker, said loading means comprise a spring means mounted on said body to act on said carrier to urge said carrier angularly about said pivoted first end such as to urge said proximal end of said striker towards said retracted position, and a latch member is pivoted to said body, and is connected to said trigger to be turned by said trigger when said trigger is pivoted, said latch member having a first part which is engaged by said second end of said carrier and has a second part which is engageable by said actuator when said latch member has been turned a predetermined extent by said trigger upon actuation of said trigger to operate said prime mover, said latch member being pivoted by the impact of said engagement such as to move said first part relative to said second end of said carrier and allow said carrier to urge said proximal end of said striker towards said retracted position to be struck by said actuator, and said latch member being turned by said trigger back to a position in which said first part re-acts on said second end of said carrier for said carrier to move said striker away from said retracted position when said trigger is returned to its said inoperative condition by said spring means.

7. A fastener applicator comprising a body, a prime mover in said body, a flywheel driven by said prime mover, an actuator rotatable with said flywheel and having a striking surface, a fastener striker guided in said body for movement between a retracted position and a fired position to which it is urged by said actuator rotating with said flywheel so that said striking surface of said actuator strikes said striker, releasable transmission means operative between said prime mover and said flywheel, said transmission means causing said flywheel to be disconnected from said prime mover each time said actuator striking surface strikes said striker such that kinetic energy developed at said flywheel by its rotation is used to drive said striker to said fired position, and means on said body for retaining at least one fastener in position to be driven by said striker.

8. A fastener applicator according to claim 7 wherein said means for retaining at least one fastener comprise a magazine for holding a plurality of fasteners and for feeding each fastener to the position to be driven by said striker.

* * * * *